(12) United States Patent
Dupuis

(10) Patent No.: US 7,549,859 B2
(45) Date of Patent: Jun. 23, 2009

(54) INSTALLATION AND PROCESS FOR CALCINING A MINERAL LOAD CONTAINING A CARBONATE IN ORDER TO PRODUCE A HYDRAULIC BINDER

(75) Inventor: Jacques Dupuis, Chazay D'Azergues (FR)

(73) Assignee: Technip France (FR)

( * ) Notice: Subject to any disclaimer, the term of this patent is extended or adjusted under 35 U.S.C. 154(b) by 287 days.

(21) Appl. No.: 11/577,573

(22) PCT Filed: Sep. 22, 2005

(86) PCT No.: PCT/FR2005/002360

§ 371 (c)(1),
(2), (4) Date: Apr. 19, 2007

(87) PCT Pub. No.: WO2006/042923

PCT Pub. Date: Apr. 27, 2006

(65) Prior Publication Data

US 2007/0248925 A1    Oct. 25, 2007

(30) Foreign Application Priority Data

Oct. 19, 2004   (FR)   ................................ 04 11103

(51) Int. Cl.
*F27B 15/02* (2006.01)
(52) U.S. Cl. ............................. 432/58; 106/709; 432/15
(58) Field of Classification Search ................ 432/15, 432/58; 106/100, 700, 701, 703, 709; 110/245, 110/345, 346; 122/4 D
See application file for complete search history.

(56) References Cited

U.S. PATENT DOCUMENTS 4,169,701 A   10/1979  Katayama et al. ............. 432/58

(Continued)

FOREIGN PATENT DOCUMENTS

EP           0 754 924         1/1997

(Continued)

OTHER PUBLICATIONS

M. Paliard, M. Makris: Energy efficiency in the cement industry' Jan. 1, 1990, J. Sirchis, XP008047489.

(Continued)

*Primary Examiner*—Gregory A Wilson
(74) *Attorney, Agent, or Firm*—Ostrolenk, Faber, Gerb & Soffen LLP

(57) ABSTRACT

The invention relates to an installation comprising a combustion chamber (15) provided with means (53) which are used to introduce the mineral load and are connected to a pre-heater (27), combustion means (55) for maintaining the chamber (15) at a temperature of between 700° C. and 900° C., means (57) for introducing a treatment gas having a controlled carbon dioxide content in order to oppose the dissociation of the carbonate in the chamber (15), and means (61) for removing the calcinated mineral load guided into a cooler (31). The chamber (15) comprises means (51) for forming a fluidised bed. The means (57) for introducing treatment gases are supplied at least partially by a line (91) or deriving part of the combustion flue gases of the chamber (15) emitted by means for discharging (21) said flue gases into the atmosphere. The invention can be used for the production of a cement-type hydraulic binder.

13 Claims, 6 Drawing Sheets

U.S. PATENT DOCUMENTS

| | | | | |
|---|---|---|---|---|
| 4,248,639 A | * | 2/1981 | Quittkat | 106/759 |
| 4,707,350 A | | 11/1987 | Baudequin et al. | 423/637 |
| 4,737,191 A | | 4/1988 | Meynardi | 106/85 |
| 5,122,190 A | * | 6/1992 | von Seebach et al. | 106/761 |
| 5,713,734 A | * | 2/1998 | Makris et al. | 432/106 |
| 5,944,870 A | * | 8/1999 | Edlinger | 75/434 |
| 6,210,154 B1 | * | 4/2001 | Evans et al. | 432/106 |
| 6,601,541 B2 | * | 8/2003 | Burdis et al. | 122/4 D |
| 2007/0248925 A1 | * | 10/2007 | Dupuis | 432/58 |

FOREIGN PATENT DOCUMENTS

JP   09 002850   1/1997

OTHER PUBLICATIONS

International Search Report PCT/FR2005/002360 dated Mar. 31, 2006.

* cited by examiner

INSTALLATION AND PROCESS FOR CALCINING A MINERAL LOAD CONTAINING A CARBONATE IN ORDER TO PRODUCE A HYDRAULIC BINDER

CROSS REFERENCE TO RELATED APPLICATIONS

The present application is a 35 U.S.C. §§ 371 national phase conversion of PCT/FR2005/002360 filed 22 Sep. 2005, which claims priority of French Application No. 0411103 filed 19 Oct. 2004. The PCT International Application was published in the French language.

BACKGROUND OF THE INVENTION

The present invention relates to an installation for calcining a mineral load containing a carbonate in order to produce a hydraulic binder, of the type comprising at least one calciner, the installation successively comprising a preheater, at least one calciner for producing a hydraulic binder comprising a combustion chamber and a cooler; the combustion chamber having:

means for introducing the mineral load into the chamber, connected to the preheater;

combustion means for maintaining the chamber at a temperature between 700° C. and 900° C., the combustion means having means for introducing an oxidizing gas for combustion coming from the cooler into the chamber;

additional means for introducing a treatment gas having a controlled carbon dioxide content into the chamber in order to oppose the dissociation of the carbonate in the chamber; and means for removing the calcined mineral load that open into the cooler;

the installation comprising means for discharging the flue gases coming from the or each calciner into the atmosphere.

The term "hydraulic binder" is understood to mean a powdery material composed of fine particles, which, in contact with water, react by forming a solidified block and develop mechanical strength properties. Examples of hydraulic binders are cements, limes, slags, pozzolans and ash from fossil fuel power stations.

The aforementioned installation is intended to produce an artificial hydraulic binder denoted by the term "kalsin", as described in application EP-A-0 167 465.

Kalsin-type binders are products based on clay phases and on at least one carbonate, preferably a calcium carbonate with optionally a magnesium carbonate. The carbonate is activated by dehydroxylation and by calcium compounds, without forming free lime.

The term "carbonate" denotes a salt resulting from the combination of carbonic acid with a base. This salt comprises a carbonate anion and a metal cation, preferably an alkali or alkaline-earth metal cation.

The installation may also produce, at the same time as the kalsin, cement clinker. The term "cement clinker" is understood to mean the material exiting a fuel-fired rotary kiln, said material having formed balls or granules by partial melting at high temperature, for example around 1500° C., and by chemical compounds of various oxides such as calcium, silicon, aluminum and iron oxides. The clinker thus obtained is, after grinding with suitable additives, capable of producing a cement. A known installation for producing clinker is described in EP 0 754 924.

Known from the article "High energy savings through the use of a new high performance hydraulic component" by M. Paliard and M. Makris, in the work "Energy efficiency in the cement industry" edited by J. Sirchis, from Elsevier publishers (1990) is an installation for producing kalsin of the aforementioned type, which comprises a calciner having a fuel combustion region, into which an oxidizing gas for combustion that comes from the cooler is introduced, and a region for containing the load to be calcined, into which a gas having a controlled carbon dioxide partial pressure is introduced.

The carbon dioxide partial pressure is high in the containment region in order to oppose the dissociation of the carbonates.

However, the carbon dioxide that is introduced into the containment region is expelled into the atmosphere, which contributes to increasing the pollutant emissions in the atmosphere.

SUMMARY OF THE INVENTION

One object of the invention is therefore to provide a calcining installation of the aforementioned type that has reduced pollutant emissions.

To that end, one subject of the invention is an installation of the aforementioned type, characterized in that the chamber comprises means for forming a fluidized bed, and in that the means for introducing the treatment gas are supplied, at least partially, by at least one bypass duct with some of the flue gases, the bypass duct coming from the means for discharging the gases.

The invention may comprise one or more of the following characteristics, taken individually or according to any technically possible combination:

the means for discharging the gases comprise a duct for extracting the flue gases coming from the combustion chamber, the bypass duct being tapped off the extraction duct;

the extraction duct is connected to the preheater;

it comprises an additional calciner for producing clinker that is different from the calciner for producing a hydraulic binder, the additional calciner comprising a flame combustion furnace and the means for discharging the gases comprise an additional duct for extracting the flue gases from the flame combustion furnace, the bypass duct being tapped off the additional extraction duct;

the additional extraction duct is connected to an additional preheater, the additional preheater emerging into the additional calciner;

the combustion means successively comprise, between the means for forming the fluidized bed and the means for introducing a gas having a controlled carbon dioxide content:

fuel supply means; then means for injecting the oxidizing gas for combustion coming from the cooler into the chamber;

the cooler is at least partially supplied by a secondary bypass duct with some of the flue gases, coming from the means for discharging the gases;

the cooler comprises secondary means for forming a fluidized bed in order to cool the calcined mineral load;

it comprises recirculation means connecting a downstream region of the combustion chamber, located downstream of the means for introducing the treatment gas, to an upstream region of the chamber, located upstream of the combustion means;

it comprises secondary means for removing some of the recycled mineral load circulating in the recirculation means, the secondary removal means opening into the cooler;

the means for removing the calcined mineral load emerge between the means for introducing the treatment gas and the means for forming the fluidized bed;

the combustion means comprise a secondary combustion chamber having:

secondary means for introducing some of the mineral load coming from the preheater; and means for injecting an oxidizing gas for combustion coming from the cooler into the secondary chamber; the secondary chamber being connected to the combustion chamber by an outlet duct opening between the means for introducing the mineral load and the additional means for introducing the treatment gas.

Another subject of the invention is a process for calcining a mineral load containing a carbonate in order to produce a hydraulic binder, of the type comprising at least one calcining phase, the process successively comprising a phase for preheating the mineral load in a preheater, at least one phase for calcining the preheated mineral load in a combustion chamber and a phase for cooling the calcined mineral load in a cooler;

the calcining phase comprising the steps of:

introduction of the mineral load coming from the preheater into the chamber;

combustion of a fuel in order to maintain the chamber at a temperature between 700° C. and 900° C., the combustion step comprising the introduction of an oxidizing gas for combustion coming from a cooler into the chamber;

introduction of a treatment gas having a controlled carbon dioxide content into the chamber, in order to oppose the dissociation of the carbonate in the chamber; and removal of the calcined mineral load in order to introduce it into the cooler;

the process comprising a phase of discharging the flue gases produced during the or each calcining phase into the atmosphere;

characterized in that the calcining phase comprises a step of forming a fluidized bed in the chamber, and in that the step of introducing a treatment gas comprises at least partially bypassing some of the flue gases discharged during the gas discharge phase and supplying the chamber with said bypassed flue gases.

BRIEF DESCRIPTION OF THE DRAWINGS

Embodiment examples of the invention will now be described with reference to the appended drawings, in which.

DESCRIPTION OF PREFERRED EMBODIMENTS

Figure 1:
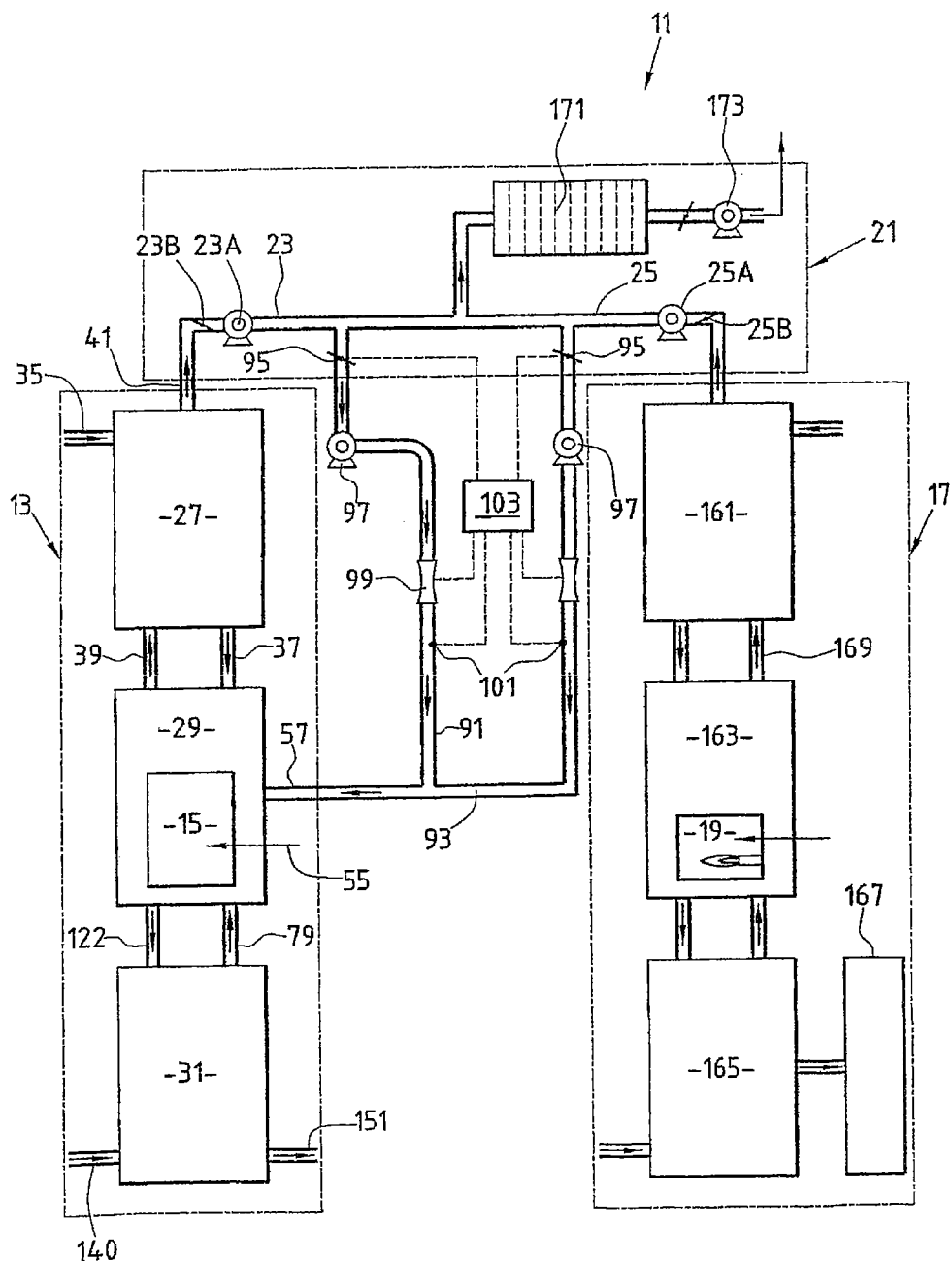
FIG. 1 is a schematic diagram representing a first installation according to the invention.

The installation 11 for calcining a raw mineral load represented in FIG. 1 comprises a unit 13 for producing kalsin, equipped with a fluidized-bed combustion chamber 15, and at the same time, a unit 17 for producing clinker, equipped with a fuel-fired rotary kiln 19.

The installation 11 also comprises means 21 for discharging the flue gases into the atmosphere comprising a duct 23 for extracting the flue gases generated in the fluidized-bed chamber 15, and an additional duct 25 for extracting the flue gases generated in the fuel-fired rotary kiln 19.

Each duct 23, 25 is equipped with a fan 23A, 25A, and with a device 23B, 25B for adjusting the fan, for example a damper, or a variable speed fan for separately adjusting the respective flow rates of the gases circulating in the respective installations 13 and 17.

In everything that follows, the terms "upstream" and "downstream" are understood relative to the circulation of the mineral load in the installation.

The unit 13 for producing kalsin successively comprises, from upstream to downstream, a preheater 27, a calciner 29 comprising the fluidized-bed combustion chamber 15 and a cooler 31.

Figure 2:
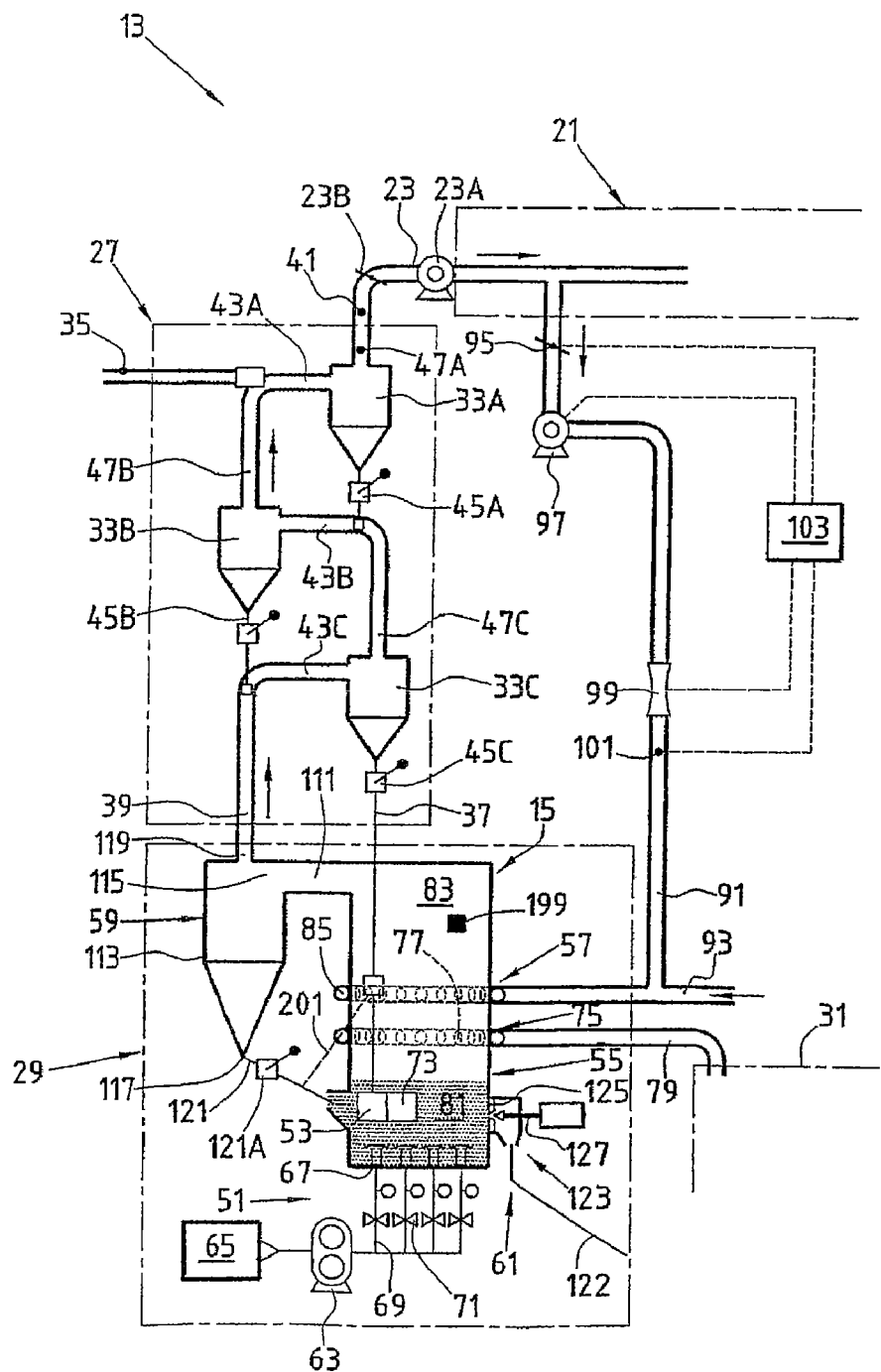
FIG. 2 is an enlarged view of an upstream part of the installation from FIG. 1.

As illustrated in FIG. 2, the preheater 27 comprises a plurality of preheating cyclones 33 mounted as a cascade, in order to bring the mineral load descending toward the calciner 29 into contact with the gases extracted from the calciner 29 that rise up toward the discharge means 21. In the example illustrated, three cyclones 33A, 33B, 33C are mounted in cascade.

The preheater 27 comprises an upper inlet 35 for introducing the raw mineral load, a lower outlet 37 for discharging the preheated load that emerges into the calciner 29, a lower inlet 39 for introducing the gases coming from the calciner 29 and an upper outlet 41 for discharging the cooled gases that emerges into the extraction duct 23.

Each cyclone 33 comprises a tangential inlet 43 for supplying gas and material, a lower outlet 45 for discharging the material that is equipped with a non-return valve and an upper outlet 47 for discharging the gas.

The upper inlet 35 for introducing the raw mineral load is connected to the gas duct leading to the tangential inlet 43A for supplying the upper cyclone 33A.

The lower outlet 37 for discharging the preheated load consists of the lower outlet 45C of the lower cyclone 33C.

The lower inlet 39 for introducing the gases coming from the calciner leads into the tangential inlet 43C of the lower cyclone 33C.

The upper outlet 41 for discharging the cooled gases consists of the upper outlet 47A of the upper cyclone 33A.

The tangential inlet 43B of the intermediate cyclone 33B is connected, on the one hand, to the lower outlet 45A of the upper cyclone 33A, and, on the other hand, to the upper outlet 47C of the lower cyclone 33C.

The upper outlet 47B of the intermediate cyclone 33B is connected to the tangential inlet 43A of the upper cyclone 33A. The lower outlet 45B of the intermediate cyclone 33B leads into the tangential inlet 43C of the lower cyclone 33C.

As illustrated in FIG. 2, the fluidized-bed combustion chamber 15 extends approximately vertically. It comprises, from upstream to downstream, from the bottom to the top in FIG. 2, means 51 for forming a fluidized bed, an inlet 53 for introducing the preheated mineral load, combustion means 55, an inlet 57 for introducing a treatment gas having a controlled carbon dioxide content, and means 59 for recirculating the calcined mineral load. The chamber 15 is, in addition, equipped, between the means 51 for forming the fluidized bed and the inlet 53 for introducing the mineral load, with an adjustable side outlet 61 for removing the calcined mineral load.

The means 51 for forming the fluidized bed comprise a compressor 63 connected, on the one hand, to a gas source 65, and, on the other hand, to a plurality of nozzles 67 for injecting the fluidizing gas.

The source 65 contains, for example, carbon dioxide or a gas comprising a mixture of carbon dioxide and oxygen, for example air mixtured with flue gases or gases coming from a reactor producing carbon dioxide, such as for example the rotary kiln 19.

The volume content of carbon dioxide in this gas is for example between 10% and 40%. The volume content of oxygen in this gas, if it contains any, is for example between 3% and 21%.

The nozzles 67 are placed in the bottom of the combustion chamber 15. Each nozzle 67 is connected to the compressor 63 by a duct 69 equipped with a regulating valve 71.

The inlet 53 for introducing the mineral load is connected to the discharge outlet 37 of the preheater 27. It leads sideways into the combustion chamber 15.

The combustion means enable fuel, with or without oxidizing gas for combustion, to be introduced into the chamber 15 by means of burners.

The combustion means 55 comprise an inlet 73 for supplying fuel and an inlet 75 for injecting an oxidizing gas for combustion.

The inlet 73 for supplying fuel is placed approximately at the same level as the inlet 53 for introducing the mineral load. It is offset sideways relative to that introduction inlet 53.

The inlet 73 is connected to an installation for storing, measuring out and transporting fuels (not shown) that contains for example low quality fuels.

The term "low quality fuel" is understood to mean, for example, waste or by-products such as petroleum coke, used tires, plastic residues, sawdust, used oils, sludges or animal meal, that have a low calorific value and that are difficult to burn. As these low quality fuels are generally available on the market at low cost, their use therefore represents a significant economic advantage.

The inlet 75 for injecting the oxidizing gas for combustion comes out downstream of the inlet 73 for supplying fuel, in the vicinity of this inlet 73.

This inlet 75 is formed from a plurality of peripheral openings leading into the chamber 15. These openings are spread along an upstream coil 77 for injecting the gas, encircling the combustion chamber 15.

This upstream coil 77 is directly connected to an upper outlet 79 for discharging the gases from the cooler 31. The oxidizing gas for combustion introduced by the injection coil 77 is relatively rich in oxygen. The volume content of oxygen in this gas is for example between 3% and 21%.

Advantageously, this gas is relatively low in carbon dioxide. The volume content of carbon dioxide in this gas is for example between 0% and 5%.

The region 81 located between the injection nozzles 67 and the inlet 75 for injecting the oxidizing gas for combustion defines a region of dense fluidized bed, in which the mineral load is contained. The region 83 downstream of the inlet 75 defines a region of expanded fluidized bed.

The height of the dense region 81, that is to say the distance that separates the injection nozzles 67 from the inlet 75 for supplying the oxidizing gas for combustion is chosen at the time of the design of the installation 11, depending on the nature of the fuel that will be used in this installation 11. More specifically, this height is increased in the case where low quality fuels are used and decreased if the fuels used are easy to burn, like fuels having a high calorific value, such as fuel oil, natural gas or some coals.

The inlet 57 for introducing a gas having a controlled carbon dioxide content is formed by a plurality of peripheral openings leading into the chamber 15, spread along a downstream coil 85 for introducing the gas.

The downstream coil 85 is placed downstream of the upstream coil 77, above this coil 77 in FIG. 2.

The introduction inlet 57 is supplied by first and second bypass ducts 91 and 93 coming from the means 21 for discharging the flue gases.

As illustrated in FIG. 1, the first bypass duct 91 is tapped off the duct 23 for extracting the flue gases generated in the combustion chamber 15.

The second bypass duct 93 is tapped off the additional duct 25 for extracting the flue gases generated by the fuel-fired kiln 19.

Each bypass duct 91, 93 is equipped with instrumentation comprising, successively from the extraction duct 21, 25 respectively, a damper 95 for adjusting the flow rate, a blower 97, a flowmeter 99 and a sensor 101 for measuring the volume content of carbon dioxide in the duct 91, 93.

Each component contained in the instrumentation is electrically connected to a central unit 103 for adjusting the carbon dioxide content in the gas having a controlled content that passes through the inlet 57.

The gas having a controlled content of carbon dioxide is relatively rich in carbon dioxide. The volume content of carbon dioxide in this gas is for example between 20% and 40%.

Advantageously, this gas is, in addition, relatively low in oxygen. The volume content of oxygen in this gas is for example between 0% and 5%.

With reference to FIG. 2, the recirculation means 59 comprise successively from upstream to downstream, from the top to the bottom in FIG. 2, a duct 111 for discharging the material and the gas and a cyclone separator 113.

The discharge duct 111 leads transversely to the upper end of the combustion chamber 15.

The cyclone 113 comprises a tangential inlet 115 connected to the discharge duct 111, a lower outlet 117 for discharging the material, and an upper outlet 119 for discharging the gas that forms the lower inlet 39 for introducing gases into the preheater 27.

The outlet 117 leads into a recirculation duct 121 that opens sideways into the combustion chamber 15 between the gas injection nozzles 67 and the inlet 53 for introducing the mineral load, in the vicinity of this inlet 53. The opening of the duct 121 into the chamber 15 is preferably located on the same side as the inlet 53. The recirculation duct 121 is provided with a non-return valve 121A.

Figure 3:
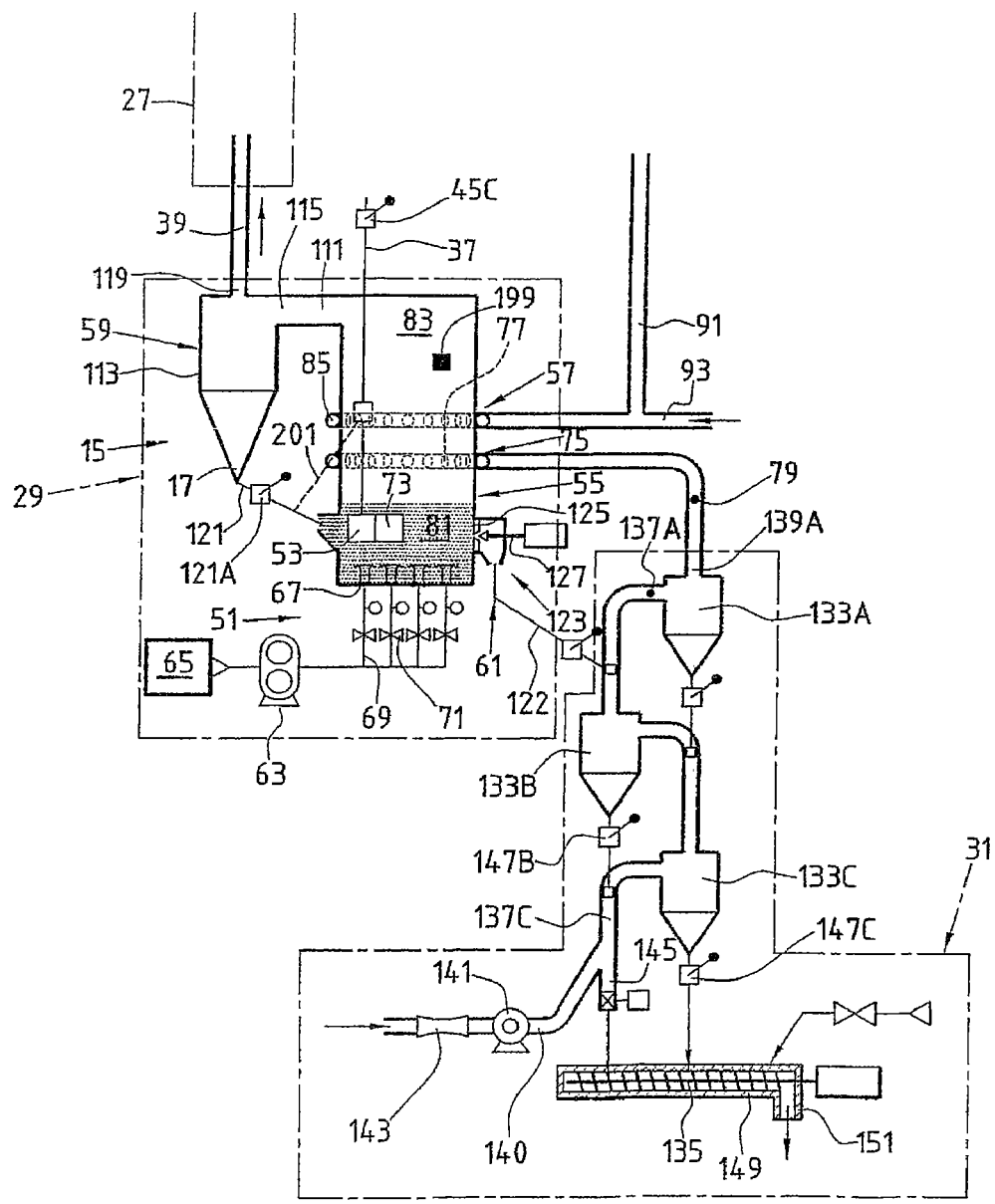
FIG. 3 is an enlarged view of a downstream part of the installation from FIG. 1.

With reference to FIG. 3, the outlet 61 for removing the material leads into an inlet 122 for supplying the material from the cooler 31. It is equipped with a valve 123 for controlling the amount of mineral load removed.

The control valve 123 comprises, for example, a frustoconical flow passage 125 and a movable conical piston 127 for closing this passage 125.

The closing piston 127 is mounted on the end of a rod that can be moved in translation between a position that closes the passage and a position that completely opens the passage.

The outlet of the valve 123 is equipped with a non-return valve.

The cooler 31 comprises a plurality of cooling cyclones 133 mounted in cascade, of the same structure as the preheater 27, and a screw 135 for removing the final product.

However, unlike the preheater 27, the tangential inlet 137A of the upper cooling cyclone 133A is connected to an outlet of the removal valve 123.

Furthermore, the upper outlet 139A of the upper cyclone 133A is connected to the upstream injection coil 77.

The tangential inlet 137C of the lower cyclone 133C is supplied by a duct 140 for introducing fresh air, equipped with a fan 141 that adjusts the intake of fresh air and a flowmeter 143 downstream of the fan 141 in the flow direction of the fresh air.

A tap 145 is provided between the tangential inlet 137C and the removal screw 135, under the introduction duct 140, in order to recover the mineral material coming from the lower outlet 147B of the intermediate cyclone 133B that would not be carried away by the current of fresh air coming from the air introduction duct 140.

The outlet 147C for discharging material from the lower cyclone 133C also leads into the removal screw 135.

The removal screw 135 is placed in a cooling chamber 149 whose walls are cooled by water circulation. Thus, the material coming from the tap 145 and from the outlet 147C is cooled, by indirect exchange, without contact nor mixing with the cooling water. The chamber 149 leads into a lower outlet 151 for discharging kalsin.

The unit 13 for producing kalsin is free from grinding means.

With reference to FIG. 1, the unit for producing clinker is, for example, of the type described in application EP 0 754 924. It comprises, from upstream to downstream, a meal preheater 161, an additional calciner 163 for the preheated meal, equipped with a fuel-fired rotary kiln 19, a cooler 165 for the calcined meal forming the clinker and a device 167 for grinding the cooled clinker.

The unit 13 comprises a duct 169 for discharging the flue gases generated in the rotary kiln 19 that extends between the calciner 163 and the preheater 161.

Furthermore, the additional extraction duct 25 is connected to the preheater 161. The flue gases produced in the kiln 19 rise through the preheater 161 and are discharged via the duct 25.

The means 21 for discharging the gases comprise at least one filter 171 into which the extraction ducts 23, 25 emerge, and a fan 173 for discharging the gases into the atmosphere, connected to an outlet for discharging the gases from which the dust has been removed by the filter 171.

The process for producing kalsin in the installation 11 will now be described.

This process comprises a step of preheating the mineral load, a step of calcining the preheated mineral load and a step of cooling the calcined mineral load.

In the preheating step, the raw mineral load or "raw meal" is introduced into the preheater 27 via the inlet 35.

The meal is obtained from a mixture, called a "raw mix", of calcium carbonate, with or without magnesium carbonate and clays or marls, containing silicon, aluminum and/or iron oxides.

The raw mix is ground in a known way in vertical roller mills or in ball mills to a fineness characterized by a weight quantity of particles of less than 200 microns of around 98% and a weight quantity of particles of less than 100 microns of around 80% to 90%.

With reference to FIG. 2, the raw mineral load flows successively from the top to the bottom in the cyclones 33, countercurrent to the flue gases coming from the calciner 29 via the inlet 39.

The mineral load is thus preheated in the preheater 27 by the flue gases to a temperature approximately between 650° C. and 800° C. level with the outlet 37.

During this preheating, dehydroxylation reactions of the clays occur when the temperature is between 500° C. and 700° C.

In the combustion step, the preheated mineral load is introduced into the combustion chamber 15 through the inlet 53 for introducing the material.

Under the influence of the injection, through the nozzles 67, of the fluidizing gas coming from the source 65, the mineral load forms a dense fluidized bed in the region 81.

The concentration of material in the dense region 81 is approximately between 50 kg/Sm$^3$ to 200 kg/Sm$^3$ of gas considered at standard temperature and pressure conditions (0° C. and 100,000 Pa). The velocity of the gases in the region 81 is between 0.6 m/s and 0.8 m/s, considered at actual temperature and pressure conditions.

Above the dense region 81, the material suspended in the form of a rising stream is then picked up by the gases coming from the gas supply inlet 75 and the gas introduction inlet 57. Thus, in the expanded region 83, a fluidized bed expanded by the dilute phase is obtained, in which the velocity of the gases is greater than 2 m/s and preferably between 3 m/s to 5 m/s, and the material concentration is decreased relative to that of the dense phase in the dense region 81.

Simultaneously, the fuel is introduced into the region 81 via the feed inlet 73. The fuel is brought into close contact with the load by the mixing produced by the fluidization phenomenon produced by the means 51.

In the dense region 81, the combustion of the fuel is initiated thanks to the oxygen contained in the fluidizing gas. This start of the combustion consumes all the oxygen coming from the gas source 65, creating a gas atmosphere rich in carbon dioxide all around the mineral load particles.

On contact with the oxidizing gas for combustion coming from the cooler 31 through the coil 77, the combustion of the fuel continues more rapidly.

The temperature is then between 700° C. and 900° C. in the combustion chamber 15.

Calcium compounds are formed between the silicon, aluminum and/or iron oxides activated during the preheating step and the activated calcium carbonate, without releasing carbon dioxide.

To prevent the carbonates contained in the mineral load from dissociating after the introduction of the oxidize gas via the inlet 77, the gas having a controlled carbon dioxide content, formed from some of the flue gases generated in the calciner 29 and from some of those generated in the calciner 163 of the unit 17 for producing clinker, is introduced into the chamber 15 through the downstream coil 85.

The central unit 103 adjusts the flow rate of the gas injected depending on the levels of carbon dioxide measured by the sensors 101 in order to maintain the carbon dioxide level in the chamber 15, measured by a sensor 199, approximately between 25% and 40%.

The dissociation of the carbonates in the expanded region 83 is thus reduced, which decreases the production of carbon dioxide.

This result is also obtained when an external gas source having a controlled carbon dioxide content, such as a tank, is connected to the coil 85, instead of the ducts 91 and 93.

In the example shown, recycling some of the flue gases coming from the calcining chamber 15 and from the fuel-fired kiln 19 prevents additional carbon dioxide from being introduced into the installation 11, which also contributes to reducing pollutant emissions into the atmosphere.

Furthermore, the gas introduced via the coil 85 has a carbon dioxide content that is adapted so as not to detract from the combustion of the fuel in the expanded region 83, even if this fuel is of low quality. It is therefore possible to use a fluidized-bed chamber 15 to carry out the calcination, even with a low quality fuel.

In addition, the distance between the coils 85 and 77 is chosen to be greater when the fuel used is of low quality. As the dissociation of carbonates with the release of carbon dioxide is linked to the supply of heat generated by combustion of the fuel, it is possible, when low quality fuels that burn slowly are used, to have a greater reaction volume between the two coils 85 and 77, without risking too fast a combustion that causes dissociation of the carbonates. This arrangement facilitates the use of low quality fuels.

The mineral load is then carried by the gases toward the upper end of the chamber 15, then discharged through the duct 111 and the cyclone 113. It is then reintroduced into the dense region 81 via the recycling duct 121. The load thus carries out on average several calcining cycles in the combustion chamber 15.

In the cooling step, according to FIG. 3, some of the calcined load is removed through the valve 123 and flows by gravity into the successive cooling cyclones 133. The load is cooled by fresh air introduced by the duct 140 and flowing countercurrently to the load in the cooling cyclones 133.

The thus cooled load has a temperature between 350° C. and 250° C. at the inlet of the screw 135. It is then discharged via the screw 135, while undergoing a final cooling. The end product discharged by the outlet 151 is a hydraulic binder denoted by the term kalsin.

This end product only requires a low grinding energy, because it is in the form of a fluid powder, only a few particles of which may sometimes agglomerate.

If necessary, the end product is partially mixed with the clinker produced in the unit 17 for producing clinker, in the amounts specified in EP 0 167 465 in order to constitute, after grinding, a hydraulic binder.

In one variant represented by dotted lines in FIG. 2, a material bypass duct 201 is tapped off between the material outlet 37 of the preheater 29 and the inlet 53 for introducing into the calcining chamber 15, in order to bypass some of the preheated mineral load. This duct 201 leads into the recirculation duct 121.

As a variant, the inlet 57 is only connected to the bypass duct 93 for the flue gases produced in the rotary kiln 19 of the unit 17.

Figure 4:
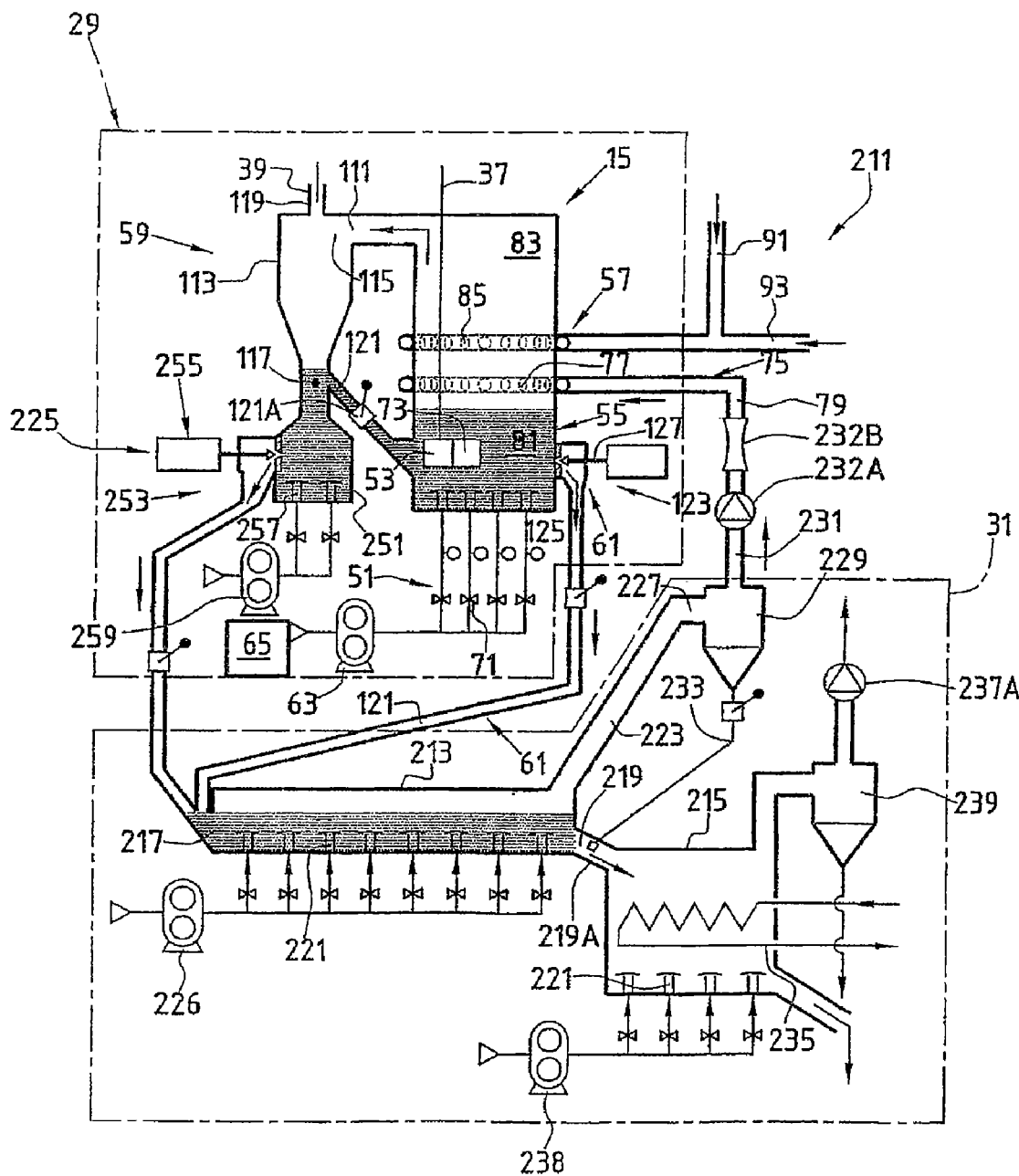
FIG. 4 is a view similar to that from FIG. 3 of a second installation according to the invention.

With reference to FIG. 4, the second installation 211 according to the invention is similar to the first installation 11.

However, unlike the first installation 11 the cooler 31 is free from a cascade of cooling cyclones.

The cooler 31 comprises upstream and downstream fluidized bed channels 213 and 215, arranged as a cascade.

The upstream channel 213 extends approximately horizontally between an inlet 217 for introducing the material, on the left on the drawing, and an outlet 219 for discharging the material leading into the downstream chamber 215. It comprises a plurality of gas injection nozzles 221 and a downstream opening 223 for discharging the gas.

The inlet 217 for introducing the material is connected, on the one hand, to a removal device 225 tapped off the recycling cyclone 113, and, on the other hand, to the outlet of the removal valve 123.

The injection nozzles 221 are distributed at the bottom of the channel 213 between the inlet 217 and the outlet 219. They are suitable for producing a dense fluidized bed with the mineral load received from the calciner 29, using compressed air or a mixture of air and carbon dioxide received from a compressor 226.

The bottom of the upstream channel 213 is slightly tilted to promote the flow of the load from the inlet 217 toward the outlet 219.

As a variant, the channel 213 is free from nozzles. The cooling air is injected via a plurality of orifices arranged in the bottom of the channel 213.

The opening 223 for discharging gas is arranged at the upper downstream end of the channel 213. The opening is connected to a tangential duct 227 for introducing into a discharge cyclone 229.

The upper outlet 231 of the cyclone 229 supplies, with oxidizing gas for combustion, the upstream coil 77 of the inlet 75, via a fan 232A and a sensor 232B for measuring the flow rate.

Furthermore, the lower material outlet 233 of the cyclone 229 leads into the outlet 219, through a non-return valve.

The structure of the second channel 215 is similar to that of the first channel 213. However, unlike the first channel 213, a shell-and-tube heat exchanger 235, supplied with water, is placed in the channel 215 opposite the injection nozzles 221. Furthermore, the upper outlet of the discharge cyclone 239 of the second channel 215 leads into the means for discharging gases 21, upstream of the filter 171 and downstream of the ducts 23 and 25, via a fan 237A.

The compressor 238 of the channel 215 is preferably supplied by ambient air.

The gases coming from the cyclones 229 and 239 are sucked up by the fans 232A and 237A. The flow rate of the gas circulating in the duct 231 is measured by the device 232B, while its flow rate is controlled by the rotational speed of the fan 232A or else using dampers whose position can be adjusted. The flow rate of the gas passing through the cyclone 239 is controlled by the speed of the fan 237A so as to obtain a slightly negative static pressure in the duct 219A connecting the outlet 219 of the first channel 213 to the second channel 215. A device for measuring pressure is installed, for this purpose, in the duct 219A. This device in the duct 219A prevents the gas coming from the channel 215 from going back toward the channel 213 via the duct 219A.

The device for extracting material 225 comprises a fluidizing chamber 251, leading into the lower extension of the recirculation cyclone 113, and a side outlet 253 for removing material that is closed off by a secondary removal valve 255.

The fluidizing chamber 251 comprises, in the bottom, a plurality of nozzles 257 for injecting compressed air that comes from a compressor 259.

The valve 255 has a structure similar to the removal valve 123. It is placed between the outlet 253 for removing material and the inlet 217 of the upstream channel 213. The outlet of the valve 255 is equipped with a non-return valve.

The operation of this installation 211 is, furthermore, similar to that of the installation 11 described with reference to FIG. 1.

However, unlike the installation 11, the calcined mineral load is cooled by the fluidizing gas injected into the successive channels 213, 215.

Figure 5:
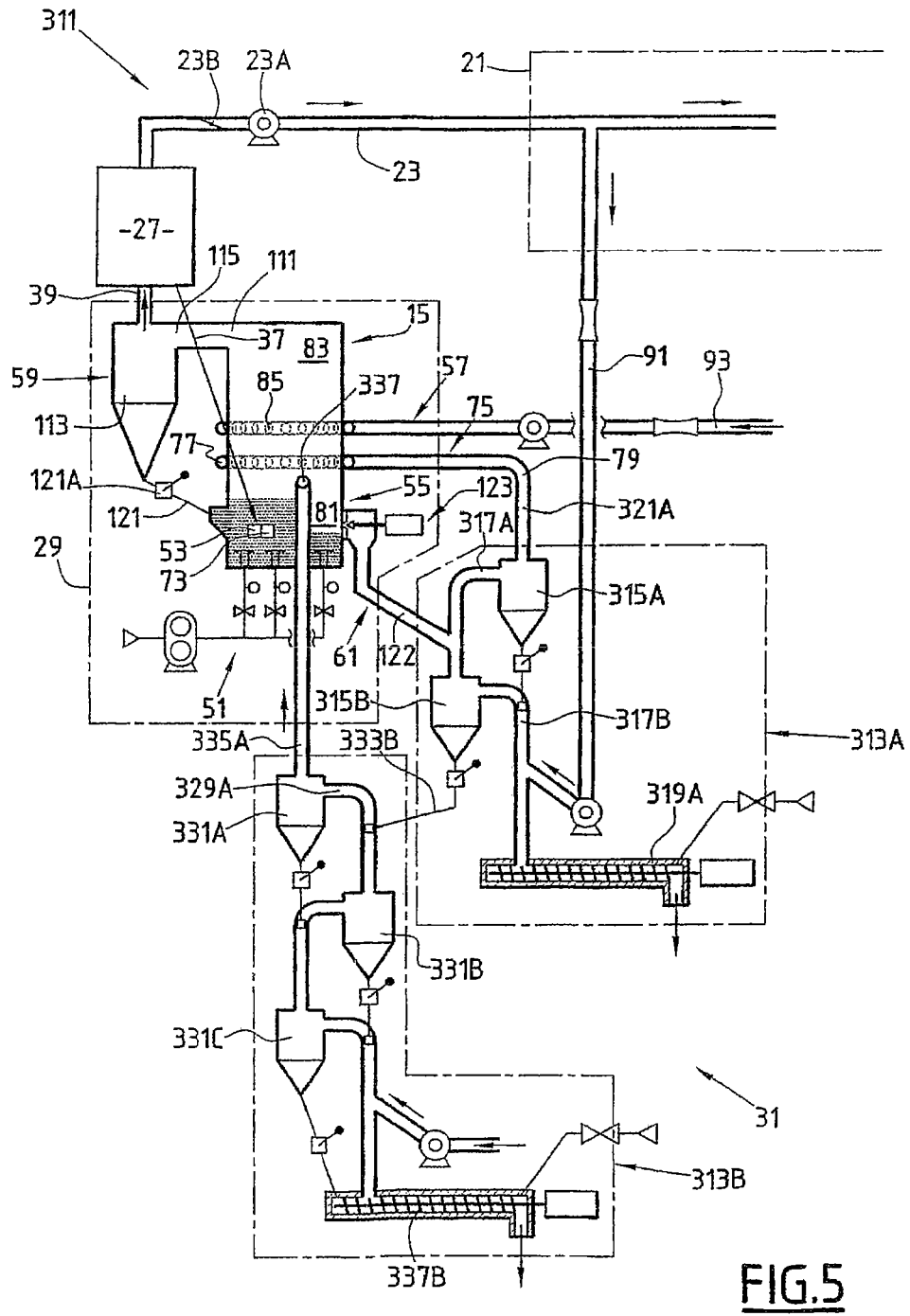
FIG. 5 is a view similar to that from FIG. 3 of a third installation according to the invention.

The installation 311 represented in FIG. 5 differs from the first installation 11 by the fact that the inlet 57 for introducing the gas having a controlled carbon dioxide content is only connected to the second bypass duct 93 coming from the unit 17 for producing clinker.

Furthermore, the cooler 31 comprises a primary cooler 313A and a secondary cooler 313B placed under the primary cooler 313A.

The primary cooler 313A comprises two cooling cyclones 315A, 315B mounted as a cascade, as described previously.

The outlet of the removal valve 123 is connected to the tangential inlet 317A of the upper cyclone 315A of the primary cooler 313A. Furthermore, the first bypass duct 91 is connected to the tangential inlet 317B of the lower cyclone 315B of the primary cooler 313A. This tangential inlet 317B is, furthermore, connected to a primary screw 319A for product extraction.

The upper outlet 321A of the cyclone 315A leads into the upstream coil 77.

The secondary cooler 313B has a structure similar to the cooler 31 of installation 11. However, the tangential inlet 329A of the upper cyclone 331A of the secondary cooler 313B is connected to the lower outlet 333B of the lower cyclone 315B of the primary cooler 313A.

Furthermore, the upper outlet 335A of the upper cyclone 331A of the secondary cooler 313B leads into the combustion chamber 15 by a secondary inlet 337 for supplying oxidizing gas for combustion. The secondary inlet 337 opens upstream of the upstream coil 77 in the vicinity of this coil 77.

The mineral load exiting the lower cyclone 331C of the secondary cooler 313B leads into the secondary product extraction screw 337B.

The mineral load extracted by the product extraction screws 319A, 337B respectively of the primary 313A and secondary 313B coolers forms the hydraulic binder in powder form, denoted by kalsin.

As a variant (not shown), the installation 11 is free from a unit for producing clinker. In this variant, the inlet 57 for introducing the treatment gas is only connected to the first bypass duct 91.

Figure 6:
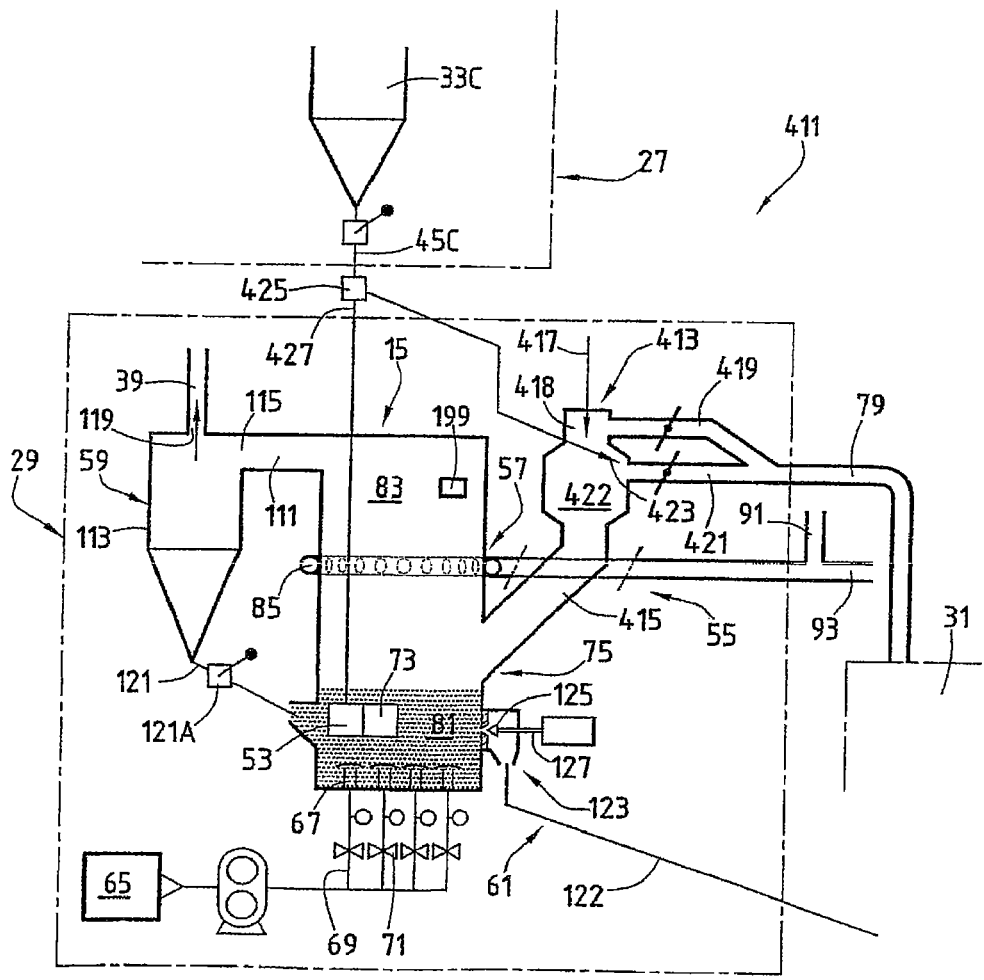
FIG. 6 is a view similar to that from FIG. 2 of a fourth installation according to the invention.

The installation 411 represented in FIG. 6 differs from that represented in FIG. 2 in that the combustion means 55 comprise a secondary combustion chamber 413 connected to the fluidized-bed combustion chamber 15 via an outlet duct 415, inclined downward.

The outlet duct 415 leads into the combustion chamber 15 between the inlet 53 for supplying the mineral load and the coil 85 for injecting the gas having a controlled carbon dioxide content, above the dense region 81. The chamber 15 is thus free from an upstream coil 77 for introducing the oxidizing gas for combustion, the tilted duct 415 constituting means 75 for injecting oxidizing gas for combustion into the chamber 15.

The secondary combustion chamber 413 comprises means 417 for supplying fuel that lead into the upper part 418 of the chamber 413. The amount of fuel introduced into the secondary chamber 413 by the means 417 is adjustable relative to the total amount of fuel sent into the calciner 29.

Furthermore, the secondary combustion chamber 413 comprises two ducts 419 and 421 for injecting oxidizing gas for combustion that open tangentially into the chamber 413, respectively into the upper part 418 and into a middle part 422 of the chamber 413. These ducts 419 and 421 are connected to the upper outlet 79 for discharging gases from the cooler 31. The outlet 79, unlike installation 11 represented in FIGS. 1 to 2, is not directly connected to the combustion chamber 15.

The secondary combustion chamber 413 comprises, in addition, an inlet 423 for supplying mineral load that emerges between the tangential ducts supplying oxidizing gas for combustion 419 and 421. This supply inlet 423 is connected to a distribution device 425 placed in the duct 427 that connects the outlet 37 of the preheater to the inlet 53 for introducing mineral load into the chamber 15. The distribution device 425 is controlled in order to adjust the relative amount of mineral load introduced into the fluidized-bed combustion chamber 15 and into the secondary combustion chamber 413.

In this installation 411, the combustion of the fuel introduced by the introduction means 417 is initiated in the upper part 418 of the secondary combustion chamber 413, in the absence of mineral load.

Thus, fuels that are extremely difficult to burn begin to catch fire in the upper part 418 of the secondary combustion chamber 413.

The heat generated by the combustion of the fuel in this upper part 418 is then transmitted to the middle part 422 where the mineral load introduced by the supply inlet 423 undergoes an, at least partial, combustion that continues in the outlet duct 415. The relative amount of mineral load introduced respectively into the combustion chamber 15 and into the secondary combustion chamber 413 is adjusted depending on the respective amount of fuel introduced into these chambers 15 and 413.

Thanks to the invention that has just been described, it is possible to have an installation for producing a hydraulic binder that significantly reduces the carbon dioxide emissions expelled into the atmosphere, by the use of a fluidized-bed calcining chamber and by recycling the flue gases generated in the installation.

The injection of recycled flue gases into the downstream region of the combustion chamber furthermore limits the production of carbon dioxide by decarbonation in this downstream region.

The thermal energy consumed in order to implement the process according to the invention in the installation is reduced, on account of the low heat of reaction and the lower combustion temperatures relative to a unit for producing clinker. Furthermore, the use of kalsin as a hydraulic binder only requires a low electric power for grinding the product delivered downstream of the cooler.

The installation according to the invention also makes it possible to use a fluidized-bed chamber to calcine the mineral load, which allows the use of low quality fuels.

The installation may comprise a unit for producing kalsin connected to a unit for producing conventional clinker, in order to increase the overall hydraulic binder production capacity in the installation, while limiting the emissions of pollutant gases relative to a unit for only producing clinker of equivalent capacity.

The invention claimed is:

1. An installation (11; 211; 311; 411) for calcining a mineral load containing a carbonate in order to produce a hydraulic binder, of the type comprising at least one calciner (29; 163), the installation successively comprising a preheater (27), at least one calciner (29) for producing a hydraulic binder comprising a combustion chamber (15) and a cooler (31);

the combustion chamber (15) having:
means (53) for introducing the mineral load into the chamber (15), connected to the preheater (27);
combustion means (55) for maintaining the chamber (15) at a temperature between 700° C. and 900° C., the combustion means (55) having means (75) for introducing an oxidizing gas for combustion coming from the cooler (31) into the chamber (15);

additional means (57) for introducing a treatment gas having a controlled carbon dioxide content into the chamber (15) in order to oppose the dissociation of the carbonate in the chamber (15); and means (61) for removing the calcined mineral load that open into the cooler (31);

the installation (11; 211; 311; 411) comprising means (21) for discharging the flue gases coming from the or each calciner (29; 163) into the atmosphere;

characterized in that the chamber (15) comprises means (51) for forming a fluidized bed, and in that the means (57) for introducing the treatment gas are supplied, at least partially, by at least one bypass duct (91; 93) with some of the flue gases, the bypass duct (91; 93) coming from the means for discharging the gases (21).

2. The installation (11; 211; 311; 411) as claimed in claim 1, characterized in that the means for discharging the gases (21) comprise a duct (23) for extracting the flue gases coming from the combustion chamber (15), the bypass duct (91) being tapped off the extraction duct (23).

3. The installation (11; 211; 311; 411) as claimed in claim 2, characterized in that the extraction duct (23) is connected to the preheater (27).

4. The installation (11; 211; 311; 411) as claimed in one of claims 1 to 3, characterized in that it comprises an additional calciner (163) for producing clinker that is different from the calciner for producing a hydraulic binder (29), the additional calciner (163) comprising a flame combustion furnace (19) and in that the means for discharging the gases (21) comprise an additional duct (25) for extracting the flue gases from the flame combustion furnace (19), the bypass duct (93) being tapped off the additional extraction duct (25).

5. The installation (11; 211; 311; 411) as claimed in claim 4, characterized in that the additional extraction duct (25) is connected to an additional preheater (161), the additional preheater (161) emerging into the additional calciner (163).

6. The installation (11; 211; 311; 411) as claimed in any one of the preceding claims, characterized in that the combustion means (55) successively comprise, between the means (51) for forming the fluidized bed and the means (57) for introducing a gas having a controlled carbon dioxide content:

fuel supply means (73) ; then means (75) for injecting the oxidizing gas for combustion coming from the cooler (31) into the chamber (15).

7. The installation (311) as claimed in any one of the preceding claims, characterized in that the cooler (31) is at least partially supplied by a secondary bypass duct (91) with some of the flue gases, coming from the means for discharging the gases (21).

8. The installation (211) as claimed in any one of the preceding claims, characterized in that the cooler (31) comprises secondary means (213, 215) for forming a fluidized bed in order to cool the calcined mineral load.

9. The installation (11; 211; 311; 411) as claimed in any one of the preceding claims, characterized in that it comprises recirculation means (59) connecting a downstream region (83) of the combustion chamber (15), located downstream of the means for introducing the treatment gas (57), to an upstream region (81) of the chamber (15), located upstream of the combustion means (55).

10. The installation (211) as claimed in claim 9, characterized in that it comprises secondary means (225) for removing some of the recycled mineral load circulating in the recirculation means (59), the secondary removal means (225) opening into the cooler (31).

11. The installation (11; 211; 311; 411) as claimed in any one of the preceding claims, characterized in that the means (61) for removing the calcined mineral load open between the means for introducing the treatment gas (57) and the means for forming the fluidized bed (51).

12. The installation (411) as claimed in any one of the preceding claims, characterized in that the combustion means (55) comprise a secondary combustion chamber (413) having:

secondary means (417) for introducing some of the mineral load coming from the preheater (27); and means (419, 421) for injecting an oxidizing gas for combustion coming from the cooler (31) into the secondary chamber (413); the secondary chamber (413) being connected to the combustion chamber (15) by an outlet duct (415) opening between the means (53) for introducing the mineral load and the additional means (57) for introducing the treatment gas.

13. A process for calcining a mineral load containing a carbonate in order to produce a hydraulic binder, of the type comprising at least one calcining phase, the process successively comprising a phase for preheating the mineral load in a preheater (27), at least one phase for calcining the preheated mineral load in a combustion chamber (15) and a phase for cooling the calcined mineral load in a cooler (31);

the calcining phase comprising the steps of:

introduction of the mineral load coming from the preheater (31) into the chamber (15);

combustion of a fuel in order to maintain the chamber (15) at a temperature between 700° C. and 900° C., the combustion step comprising the introduction of an oxidizing gas for combustion coming from a cooler (31) into the chamber (15);

introduction of a treatment gas having a controlled carbon dioxide content into the chamber (15), in order to oppose the dissociation of the carbonate in the chamber (15) ; and removal of the calcined mineral load in order to introduce it into the cooler (31);

the process comprising a phase of discharging the flue gases produced during the or each calcining phase into the atmosphere;

characterized in that the calcining phase comprises a step of forming a fluidized bed in the chamber (15), and in that the step of introducing a treatment gas comprises at least partially bypassing some of the flue gases discharged during the gas discharge phase and supplying the chamber (15) with said bypassed flue gases.

* * * * *